Oct. 21, 1969   W. C. LOE   3,473,557
FLOW DIVERTING DEVICE FOR GAS CHROMATOGRAPHS
Filed June 12, 1967   2 Sheets-Sheet 1

INVENTOR
WINSTON C. LOE
BY
Robert C. Comstock
ATTORNEY

United States Patent Office 3,473,557
Patented Oct. 21, 1969

3,473,557
FLOW DIVERTING DEVICE FOR GAS
CHROMATOGRAPHS
Winston C. Loe, Altadena, Calif., assignor to Loenco, Inc.,
Altadena, Calif., a corporation of California
Filed June 12, 1967, Ser. No. 645,435
Int. Cl. F16k 11/07; F16l 5/00
U.S. Cl. 137—343        7 Claims

ABSTRACT OF THE DISCLOSURE

An in-line flow diverting device for diverting a stream through a panel or other bulkhead of a gas chromatograph or similar instrument for flow measurement or other purposes. The device includes an inlet connection, an outlet connection, and a divert connection which is accessible from the front of the panel.

A valve body has a pair of sealing members with a spacer therebetween, all with aligned axial openings therein. A closed end tube is slidably mounted within these openings for movement between two positions. When the tube is in its inward position, the inner end of the tube seals off the axial opening in the inner sealing member leading to the outlet connection, while a radial opening in the tube is disposed within the axial opening in the spacer to connect the inlet connection to the divert connection through the spacer and tube.

When the tube is in its outward position, the inner end of the tube is withdrawn to open the outlet connection and the radial opening in the tube is sealed off by the outer sealing member to cut off the divert connection. The device can be operated manually or automatically.

BACKGROUND OF THE INVENTION

Field of the invention

In gas chromatographs or other instruments, it is frequently desirable to divert a flowing stream from one path to another, particularly for the purpose of making measurements to determine the rate of flow of the stream. It is particularly desirable to have a flow divert connection which is easily accessible, preferably from the front of the instrument panel. It is also desirable to have a divert device which permits the stream to be diverted as frequently as desired without breaking any piping connections.

Description of the prior art

The prior art known to the applicant consists of three-way valves, which are more expensive and bulky and which lack the simplicity and other desirable characteristics of the present device. If a three-way valve is not used, the prior art requires that piping connections be broken each time the stream is diverted. The applicant does not know of any prior art which permits the stream to be diverted through the front panel of the instrument.

SUMMARY OF THE INVENTION

The invention comprises an in-line flow diverting device for gas chromatographs and other instruments. The device is adapted to be mounted in a single hole in the front panel or other bulkhead of the instrument. It occupies a limited amount of panel area and the functional position of the device is readily apparent to the user without resorting to position indexing devices.

The device permits the stream to be diverted through the front panel whenever and as frequently as desired without requiring the breaking of any piping connections. It eliminates the need for a rotometer.

The device includes a two-position divert valve which is accessible and operable from the front panel of the instrument to divert the stream as frequently as desired to flow through a divert outlet connection extending through the front of the instrument panel, for the purpose of making flow measurements or for other purposes, as set forth more fully hereinafter in this application.

In an instrument having a flame ionization detector, the ordinary way of making a bubblemeter measurement is to disconnect the exit end of the colum and attach the bubblemeter. The end of the column is generally hot and this is a time consuming operation which is eliminated by use of the present invention.

The present invention also avoids opening the upstream end of the column to the atmosphere, which is undesirable.

It is accordingly among the objects of the invention to provide a flow diverting device for gas chromatographs and other instruments which is simpler and more economical and efficient in manufacture and in use, and which has all of the advantages and benefits set forth above and described in detail hereafter.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

DESCRIPTION OF THE PREFERRED EMBODIMENTS

Figure 1:
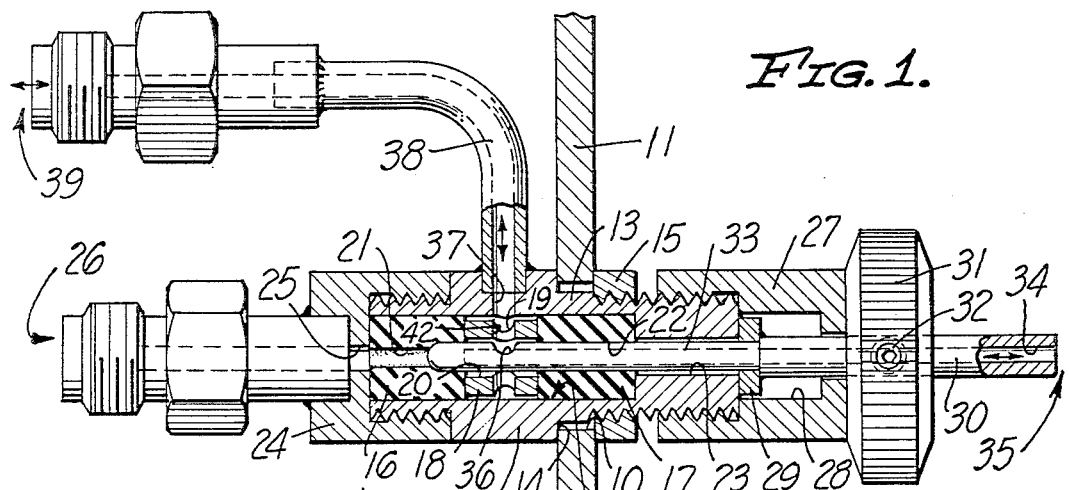
FIG. 1 is a side elevational view of a preferred embodiment of the invention, with the operating portions shown in section and with the valve in divert position.
Figure 2:
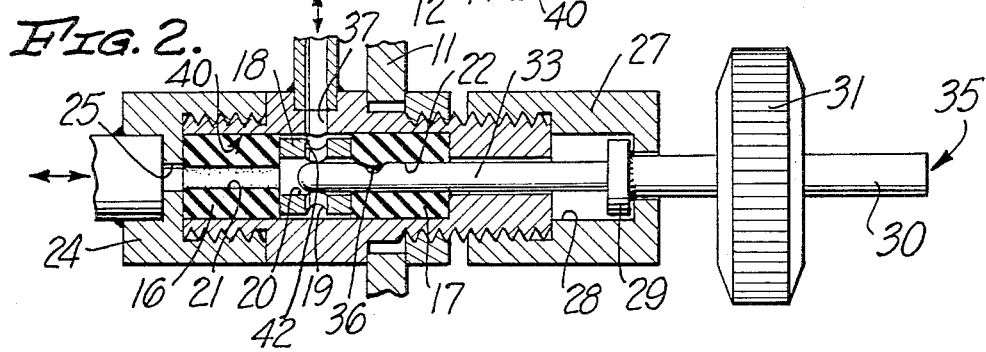
FIG. 2 is a partial view similar to FIG. 1, showing the same embodiment in normal position.

A preferred embodiment which has been selected to illustrate the invention is shown in FIGS. 1–2 of the drawings. It is adapted to be mounted in an opening 10, formed in a panel 11 or other bulkhead of a gas chromatograph or other instrument.

The device includes an elongated valve body 12 having a portion 13 which extends through the opening 10. Adjacent to one end of the portion 13 is a shoulder 14 which abuts against the inside of the panel 11. A nut 15 is screw threadedly mounted on the valve body 12 and abuts against the outside of the panel 11.

Mounted within a cylindrical recess 40 which extends into the inner end of the valve body 12 are a pair of cylindrical sealing members 16 and 17, which are preferably formed of silicone rubber, or other suitable elastomeric material. Mounted between the sealing members 16 and 17 is a nonresilient spacer 18, which has an opening 20 extending through its longitudinal axis, which opening is aligned with similar axial openings 21 and 22 which extend through the sealing members 16 and 17. Aligned with these openings is an axial opening 23 which extends through the outer end of the valve body 12.

The spacer 18 has a circumferential groove 19 extending around its midportion. The groove 19 is connected to the opening 20 by one or more radial openings 42.

An end member 24 is screw threadedly mounted on the inner end of the valve body 12. An aligned axial opening 25 extends through the end member 24 and connects with an outlet connection 26.

A cap fitting 27 is screw threadedly mounted on the outer end of the valve body 12. The cap fitting 27 has an axial cylindrical chamber 28 formed therein, the inner end of the chamber 28 being closed off by the outer end of the valve body 12, except for the opening 23.

A stop member 29 is disposed within the chamber 28 and is mounted on an elongated sleeve 30 which extends outwardly through the outer end of the cap fitting 27 along its longitudinal axis. A circular knob 31 is held on the sleeve 30 inwardly from the outer end thereof by a set screw 32.

A tube 33 extends inwardly from the stop member 29 through the aligned axial openings 23, 22 and 20. The diameter of the axial opening 20 in the spacer 18 is greater than the outside diameter of the tube 33, so that an annular space exist around the tube 33, through which space fluid can flow. The tube 33 has a closed inner end which extends into the outer portion of the opening 21 in the inner sealing member 16 when the stop member 29 is disposed in its inward position (abutting against the outer end of the valve body 12).

A fluid passage 34 extends continuously through the tube 33, stop member 29 and sleeve 30. The inner end of the tube 33 is solid, closing off the inner end of the passage 34, but the outer end of the sleeve 30 is open and forms a divert outlet connection 35.

The tube 33 is provided adjacent its inner end with a radial opening 36, which is disposed within the axial opening 20 in the spacer 18 when the tube 33 and stop member 29 are in inward position.

The valve body 12 has a radial opening 37 which is connected at its inner end to the groove 19 in the spacer 18. The outer end of the radial opening 37 is connected with a tube 38 which is attached to the valve body 12. The tube 38 is in turn connected to an inlet connection 39.

The sealing member 16 engages and is compressed from its ends by the end member 24 and the spacer 18, so that its outer periphery forms a sealing engagement with the inner periphery of the recess 40. The sealing member 17 likewise engages and is compressed from its ends by the spacer 18 and the end of the recess 40, so that its outer periphery forms a sealing engagement with the inner periphery of the recess 40.

The diameter of the tube 33 is somewhat greater than the diameter of the axial openings 21 and 22 and the sealing members 16 and 17. The sealing members 16 and 17 accordingly make a sliding sealing engagement with the outer periphery of the tube 33.

It will be noted that the device includes an inlet connection 39, an outlet connection 26 and a divert outlet connection 35. The flow of fluid (which may be gas or liquid) through the device is controlled by manual or automatic reciprocal movement of the valve control member which comprises the sleeve 30, stop member 29 and tube 33. If manual control is used, it is accomplished through the use of the knob 31.

When the stop member 29 and related parts of the valve control member are disposed in their inward positions, as shown in FIG. 1 of the drawings, the inner end of the tube 33 enters into and closes off the outer end of the opening 21, preventing any flow of fluid to the outlet connection 26.

The radial opening 37 which is connected to the inlet connection 39 is aligned with the groove 19, so that fluid flows through the openings 42 to the opening 36 in the tube 33. Fluid is thus free to flow between the inlet connection 39 and the divert outlet connection 35.

When the valve control member is moved outwardly so that the stop member 29 is disposed at the outer end of the chamber 28, as shown in FIG. 2 of the drawings, the inner end of the tube 33 is moved outwardly to free the opening 21. The opening 36 adjacent to the inner end of the tube 33 is moved outwardly and is sealed off by the sealing member 17. Fluid is accordingly free of flow only between the inlet connection 39 and the outlet connection 26.

Several ways in which this divert valve may be used are illustrated in block diagrams comprising FIGS. 4–7 of the drawings. The divert valve is particularly useful for gas chromatographs having hydrogen flame ionization detectors because the valve permits simple and rapid bubblemeter flow measurements whenever required without breaking any piping connections.

It is a very simple matter to divert the stream momentarily through the front of the panel 11 to a bubblemeter or other flow measuring device. The device also eliminates the need for a rotometer, which is less accurate and less reliable because the balls sometimes stick and cause small pressure surges and signal noise responses.

Figure 4:
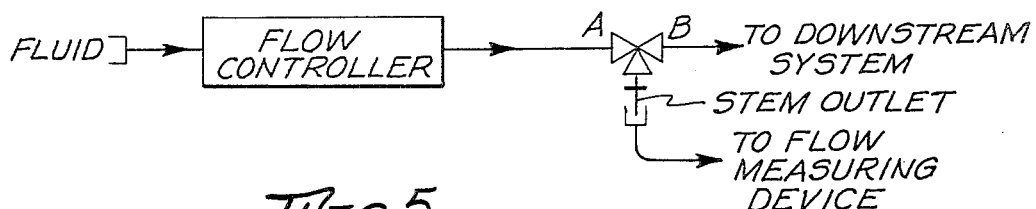
FIGS. 4–7 are diagrams showing several ways in which the invention can be used.

In a system where there are appreciable variations in downstream pressure, the divert valve is preferably used in connection with a flow controller, as shown in FIG. 4 of the drawings.

Figure 5:
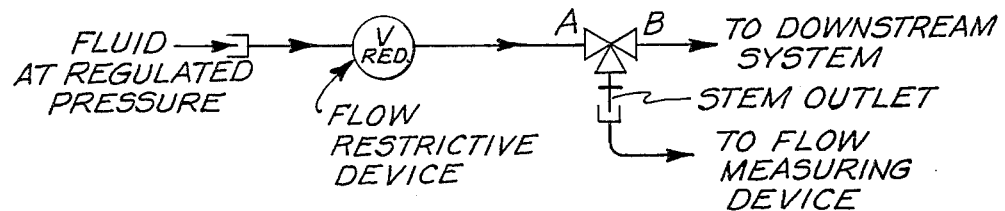

In a system where there is negligible flow resistance downstream from a flow restricting device and the operating pressure is constant, so as to maintain a constant pressure differential across the flow resistance device, the divert valve can be used without a flow controller, as shown in FIG. 5 of the drawings.

Figure 6:
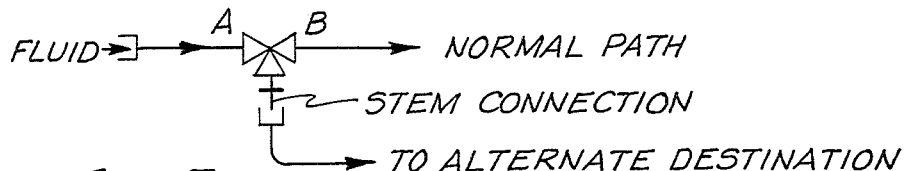

In addition to its use for making flow measurements, the divert valve is capable of other uses as well. As shown in FIG. 6 of the drawings, it can also be used to divert the flow of the stream from its normal destination to an alternative destination through the divert outlet connection.

Figure 7:
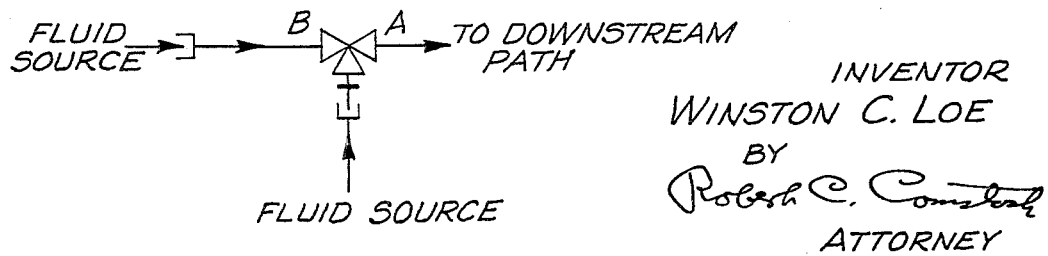

As shown in FIG. 7 of the drawings, the divert valve can also be used as an inlet connection to substitute a front bulkhead fluid source for the normal fluid source.

Figure 3:
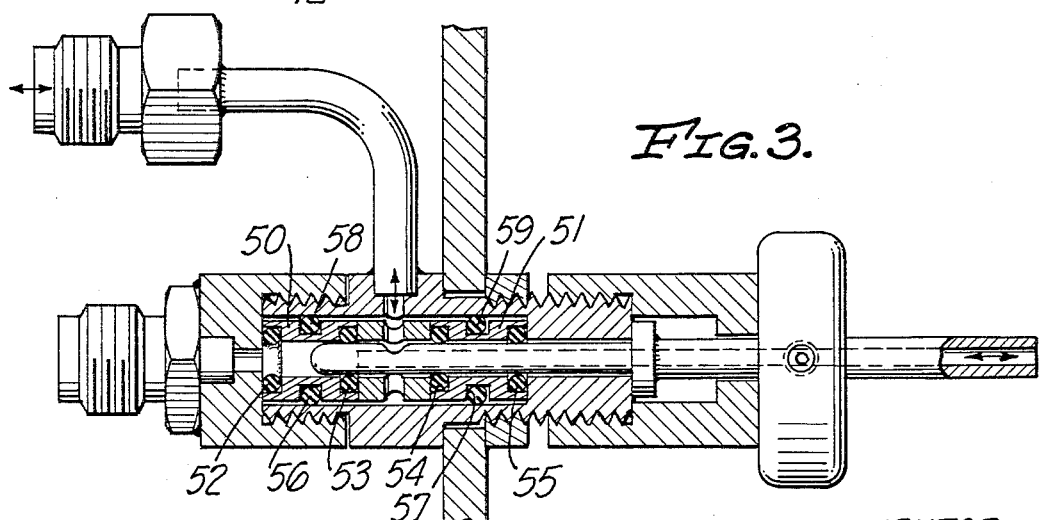
FIG. 3 is a view similar to FIG. 1 of an alternative embodiment of the invention, in which O-rings are used in place of solid elastomeric sealing members, with the valve shown in divert position.

FIG. 3 of the drawings shows an alternative embodiment of the invention which is identical in its purpose and operation and which differs from the embodiment described above only in the fact that O-ring sealing assemblies are substituted for the sealing members 16 and 17.

Instead of the sealing members 16 and 17, a pair of alternative identically formed sealing members are provided. Such sealing members comprises a body 50 and 51 having a pair of inwardly directed recesses at the opposite ends thereof in which are mounted O-rings 52 and 55, which form seals against the ends of the recess, and O-rings 53 and 54, which form seals around the outside of the tube. Annular grooves 56 and 57 extend around the midportions of the bodies 50 and 51. O-rings 58 and 59 which are mounted in the grooves 56 and 57 form seals against the adjacent inner periphery of the recess in the valve body in which they are mounted.

I claim:

1. A flow diverting device for an instrument having a panel or bulkhead, said device including a valve body, an inlet connection and an outlet connection connected to said valve body, a flow divert connection extending through said panel and available from the opposite side thereof from said inlet and outlet connections, a flow control member operable from the outside of said panel, said flow control member comprising a tube mounted for sliding reciprocal axial movement within said valve body between two positions, in the first of which said inlet connection is connected to said outlet connection through said valve body, while said divert connection is sealed off, and in the second of which said inlet connection is connected to said divert connection through said valve body, while said outlet connection is sealed off, said valve body having a recess, an inner and an outer sealing member mounted within said recess, a spacer mounted within said recess between said sealing members, said sealing members and spacer having aligned openings extending along their longitudinal axes, said outlet connection being connected to the inner end of said axial openings, said inlet connection being connected to said spacer, said tube being mounted for sliding movement with said aligned axial openings from the outer end of said openings, said sealing members frictionally engaging said tube to hold said tube in said first and second positions, said tube having a closed inner end and a radial opening spaced therefrom, said radial opening adapted to be connected with said inlet connection through said spacer in said second position, while the closed inner end of said tube extends into and closes off the axial opening in said inner sealing member, the closed inner end of said tube being withdrawn from the axial opening in said inner sealing member in said first position to open said outlet connection, while said outer sealing member seals off the radial opening in said tube from said inlet connection to close said divert connection.

2. The structure described in claim 1, the ends of said sealing members forming seals at the opposite ends of said recess, and the inner peripheries of the axial openings in said sealing members forming sliding seals with the outer periphery of said tube.

3. The structure described in claim 2, said spacer having a circumferential groove extending around its periphery, said groove being connected with said inlet connection, said spacer having at least one radial opening connecting said groove to the axial opening in said spacer.

4. The structure described in claim 3, each of said sealing members comprising a body having an inwardly directed groove at the end thereof remote from said spacer, an O-ring mounted in each of said grooves, said O-rings forming seals against the ends of said recess, each of said sealing member bodies having a second inwardly directed groove at the end thereof adjacent to said spacer, a second O-ring mounted in each of said second grooves, said second O-rings being adapted to form seals against the outer periphery of said tube.

5. The structure described in claim 4, each of said sealing member bodies having an annular external groove, a third O-ring mounted in each of said annular grooves, said third O-rings forming seals with the inner periphery of said recess.

6. The structure described in claim 3, and a sleeve connected to the outer end of said tube, a knob mounted on said sleeve on the outside of said panel, said knob being manually operable to control the movement of said tube between said first and second positions.

7. The structure described in claim 6, and a stop member mounted adjacent the outer end of said tube, said stop member being disposed within a chamber, said stop membe engaging the opposite ends of said chamber to control the movement of said tube between said first and second positions.

References Cited

UNITED STATES PATENTS 1,427,600    8/1922    Justus.
3,030,974    4/1962    Arenhold _____ 137—559 XR

FOREIGN PATENTS 1,293,911    4/1962    France.

HENRY T. KLINKSIEK, Primary Examiner

U.S. Cl. X.R.

137—360, 625.26, 625.68; 251—353